Feb. 8, 1955
J. E. HARWOOD, JR
2,701,714
SHOCK ABSORBER
Filed June 4, 1949
2 Sheets-Sheet 1
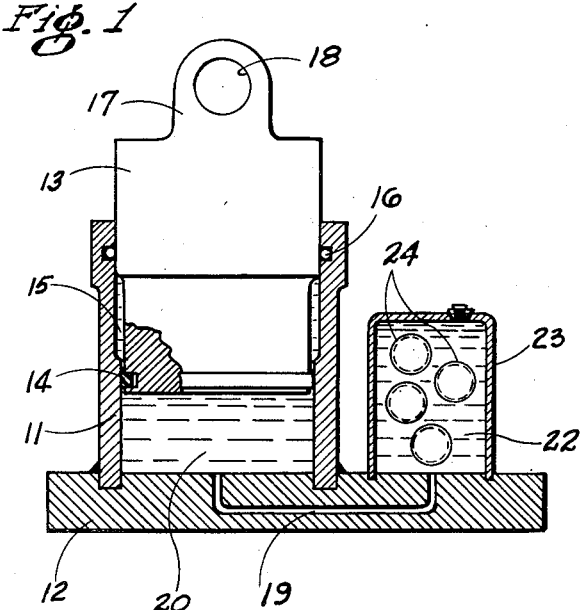
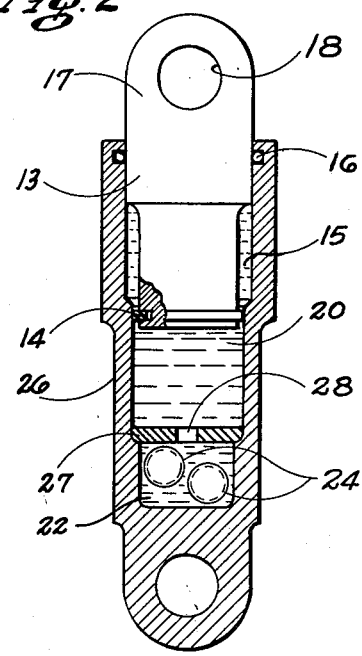
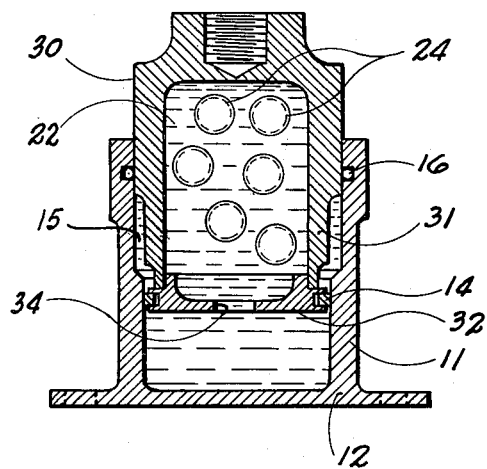
INVENTOR.
John E. Harwood, Jr.
BY Feb. 8, 1955     J. E. HARWOOD, JR     2,701,714
SHOCK ABSORBER
Filed June 4, 1949     2 Sheets-Sheet 2
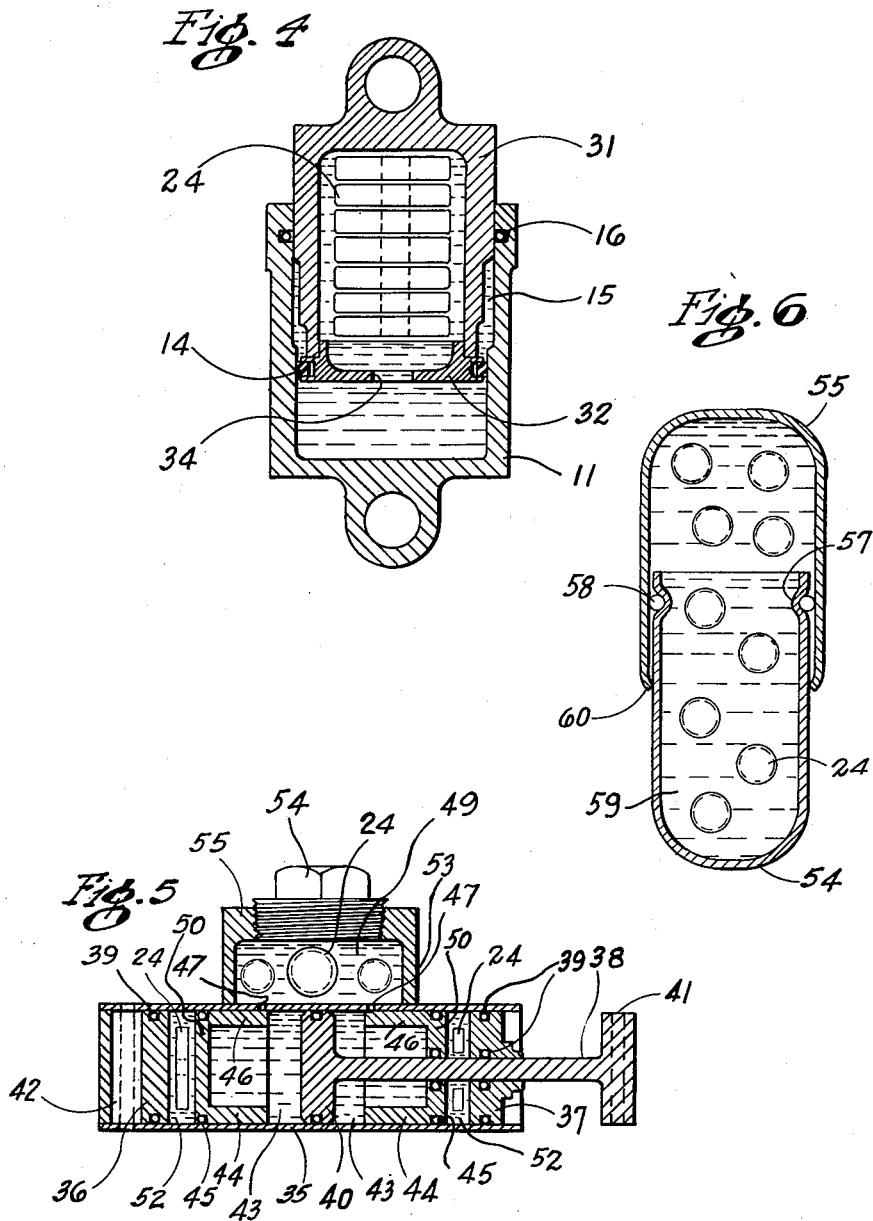

United States Patent Office 2,701,714
Patented Feb. 8, 1955

2,701,714

SHOCK ABSORBER

John E. Harwood, Jr., Cleveland, Ohio, assignor to The Cleveland Aero Products, Inc., Cleveland, Ohio Application June 4, 1949, Serial No. 97,190

4 Claims. (Cl. 267—64)

This invention relates to shock absorbers, and more particularly to a shock absorbent or vibration isolating means of returning the parts to their original position.

There have been many prior shock absorbing devices. Some of these, particularly those used as shock absorbent mountings for goods in shipment or articles installed where the isolation of vibration is important, have utilized the desirable properties of rubber in a shear stressed state. These did tend to return to their original condition after incurring a shock, but the only damping of vibration present was caused by the internal friction of the rubber.

Other devices used in automobile "shock absorbers" were primarily shock vibration dampers utilizing the viscosity of an oil and its resistance to running through an orifice to damp the vibration. These, however, had no means to return them to their original position and relied on the leaf or coil springs of the automobile to accomplish that. They are, therefore, useless as a shock mounting unless separate springs are provided.

Still other devices have been used in airplane struts, and these have combined the desirable functions of springs and damping by oil. However, the springs used have been both heavy and expensive. Compressed air has been used, but is hard to control in that it requires an air tight chamber.

Still other devices have been used to inhibit "shimmying" or long period vibration of parts. These have been primarily damping devices adapted to damp the vibrations to such an extent that they ceased.

By my invention I provide an improved type shock absorbent device which is adapted for use in any of the above mentioned applications. It provides both shock absorbing and damping qualities and is considerably less heavy than prior devices utilizing ordinary metal springs for absorbing the shock.

My device, briefly, comprises a piston and cylinder arrangement which forms a compression chamber. From compression chamber an orifice or other small passageway leads to a supply chamber. These chambers are filled with oil or some other substantially incompressible viscous liquid. In the supply chamber and preferably but not necessarily submerged in the liquid, I provide means to absorb the shock and cause the piston to return to its original position after compression. This means is, in its broadest form, merely an enclosed bubble of air or a plurality of bubbles. These are preferably enclosed in a rubber or synthetic rubber which may be either spherical or toroidal in form or any other shape desired. I also envision a double acting use of my invention as a "shimmy" or "flutter" inhibitor.

A more complete understanding of my invention may be gained by reference to the following drawings and description which form a part of this specification.

In the drawings:

Fig. 1 is a sectional view of one form of my invention;

Fig. 2 is a sectional view of an alternate form showing an alternate location of the supply chamber;

Fig. 3 is a sectional view of another alternate embodiment;

Fig. 4 is a sectional view showing an alternate form of resilient member;

Fig. 5 is a sectional view showing a double-acting embodiment of my invention; and Fig. 6 is a view of a very simple embodiment of my invention.

Reference is now made to the drawings throughout which like parts are designated by like reference characters. An embodiment of my invention adapted to be used as a shock absorbent mounting as, for instance, in a shipping case for an aircraft engine or the like, is illustrated in Fig. 1. In this embodiment a cylinder member 11 is mounted on a base 12 which may be fastened to a shipping case. A piston 13 provided with a piston ring 14, is slidably disposed in the cylinder 11. Both the cylinder and piston are shown with stepped diameters. The purpose of this formation is to provide a space 15 in which any fluid which leaks past the ring 14 may be trapped. A seal ring 16 is disposed in a groove in the cylinder surrounding the piston to prevent undue leakage out of the device. The piston 13 is provided with an ear 17 having a hole 18 therethrough for attachment of whatever device is to be carried in the case and from which the shocks are to be kept.

A small passageway 19 leads through the base 12 from the pressure chamber 20 defined by the walls of the cylinder and head of the piston 13 to a supply chamber 22. It is apparent that the compression chamber could also be in the form of a bellows or the like. The supply chamber in the simplest embodiment is a separate container 23 which is used as storage space for the fluid which serves to damp the vibrations. This fluid fills the supply chamber and the pressure chamber and may be any oil, glycerine, or other viscous fluid but is preferably a liquid and substantially incompressible.

A number of wholly enclosed gas tight chambers 24 is disposed in the supply chamber 22. These are preferably of spherical or toroidal shape and are filled with air or any other compressible gas. These chambers are enclosed by walls formed of rubber or synthetic rubber or other resilient matter of similar characteristic and are, therefore, adapted to be compressed or to expand depending on the change in pressure on the liquid in which they are submerged.

The action of the device will be apparent. When a sudden pressure or shock is applied to the base 12, the impact will cause a sudden increase in pressure in the pressure chamber 20 since the piston and its attached case or other parts will tend not to move because of their inertia. The sudden increase in pressure in the pressure chamber 20 will be transmitted through the liquid to the supply chamber 22. The increase in pressure in the supply chamber will cause the resilient chamber 24 to be compressed elastically thereby taking up the shock. Of course, with a change in direction of the force or a mere taking away of the force, the chambers 24 will tend to expand. However, because of the incompressibility of the liquid in the supply and pressure chambers, and because of its viscosity, the vibrations will be effectively damped since the liquid must flow through the small passageway 19 in order to change the pressure in the supply chamber. It will be obvious that the amount of damping may be controlled by controlling the size of the passageway 19 or if no damping is necessary, there need be only a single chamber. The amount of force necessary to move the piston a certain distance may also be controlled by adjusting the amount and pressure of entrapped air in the chambers 24.

The second embodiment of my invention as shown in Fig. 2 has exactly the same elements somewhat rearranged. This embodiment may readily be adapted for use in an airplane landing gear strut or the like, or it may be used for purposes similar to the prior described device.

The piston and cylinder arrangement are the same in the embodiment as in the prior device except that the cylinder 26 in addition to providing the enclosure for the pressure chamber 20 also encloses the supply chamber 22. These chambers are separated by a wall 27 through which the orifice 28 extends replacing the passageway 19 of the previously described device. The end connection shown in this figure allows pin or bolt connections on both ends of the device, but it will be readily apparent that any type of end connection could be used. The operations of the embodiment are the same as previously described.

The embodiment shown in Fig. 3 is a direct replacement of that of Fig. 1 because of its mounting, but it will be recognized that other mountings may be used. In this embodiment the supply chamber 22 is enclosed within the piston 30. The cylinder 11 is mounted on a base 12 similarly to the first described embodiment. The piston 30 may be made in two pieces; a skirt piece 31, and a head 32 threaded or welded in the skirt. This formation is preferred so that the resilient chamber 24 may be easily inserted into the supply chamber 22 formed in the piston. The connection between the supply and pressure chambers in the embodiment is through the orifice 34 in the head 32 of the piston.

The device shown in Fig. 4 is similar to that shown in Fig. 3 except for end fastening devices. However, in this embodiment I have shown the resilient chambers 24 in a ring form. It will be realized that they could also be in many other shapes such as discs or the like.

The operation of the prior described embodiments will be obvious from the description given with respect to the first embodiment since there is no difference in principle.

An alternative embodiment suitable for damping long period vibrations, which may be used in connection with preventing "flutter" of helicopter blades or other vibrations, such as "shimmy" of automobile steering devices, is shown in Fig. 5. This device is "double acting"; that is, it has two pressure chambers and, effectively though not literally, two supply chambers. Actually, there is a single supply chamber whose inlet or outlet is controlled by valves so that it connects to either of the pressure chambers.

More specifically, I provide a cylinder 35 having a head 36 in one end, and a head 37 in the other end. Packing glands 39 filled with packing to prevent leakage of the liquid are provided in both heads and also surrounding the piston rod 38. The piston 40 is slidably disposed in the cylinder preferably near the center longitudinally. The rod 38 extends from the piston through the head 37 and terminates in a fitting 41 adapted for the particular use to which the device is to be put. A bushing 42 near the opposite end of the cylinder is provided for attaching this end to the fixed structure.

The pressure chambers 43 in this embodiment are formed between the piston 40 and a pair of floating valves 44, one of which has an opening in which the piston rod 38 is slidably journalled. These valves 44 are full floating pistons, each having a packing gland 45 to prevent flow of the liquid in the pressure chamber 43 beyond the valve. Each valve 44 has a skirt portion 46 adapted, when the piston is centrally disposed, to cover an aperture 47 leading from the cylinder 35 on each side of the piston into the supply chamber 49. Between the head 50 of the valves 44 and the cylinder heads 36, and 37, I prefer to form a spring chamber 52 filled with a liquid and containing my resilient walled chambers 24 of one form or another. It is evident that these could be replaced by springs although the springs would weigh considerably more and would likely require greater space.

The supply chamber 49 may be formed by welding the chamber walls 53 to the walls of the cylinder 35. In the embodiment shown, the chamber is closed by a plug 54 which may be screwed into the top 55 of the chamber. The cap is provided in order that the device may be filled conveniently and, also that the resilient chambers 24 may be placed in the supply chamber.

In operation, the fitting 41 is fastened to the device which is subject to flutter, and the cylinder 35 is fastened, by any convenient means, to a stationary part. When the piston 40 moves, it moves the valve 44 with it because of the incompressibility of the liquid in the compression chamber 43. The resilient chamber 24 in the spring chambers 42 will be alternately compressed or expanded by the small vibrations and will act much like springs. It is thus apparent that any small amplitude or short period vibrations will not be damped except by internal friction since neither aperture 47 will be opened.

However, if a large amplitude, long period vibration should start, the piston 40 will be moved a considerable distance forcing the valves 44 to move with it. One of the valves by its motion will uncover one aperture 47. Then because of the pressure created in the pressure chamber 43, some of the liquid will flow into the supply chamber causing a damping action as described in reference to prior described embodiments. This will have the effect of damping the vibration and will prevent it from becoming dangerous.

I also conceive that my invention may be used in a very simple form as a spring unit in upholstery or the like. For this purpose the device could take the form shown in Fig. 6. This embodiment comprises a capsule formed of two telescoping parts; an inner part 54 and an outer part 55. While I have shown these parts with rounded ends, it is obvious that any formation of the ends which would be convenient for a particular application could be used.

The inner part 54 is formed with a packing gland 57 in which is disposed a seal ring 58 to prevent leakage of the liquid from the chamber 59 formed between the two parts. The edge 60 is rolled in slightly to prevent over-travel of one part relative to the other part by causing the edge 60 to engage the seal ring 58. The resilient walled chambers 24 are disposed in the liquid as in prior described embodiments and act as springs in the manner of an air cushion.

It will be obvious to those skilled in the art that while I have shown the chambers 24 as being completely hollow, still they could be formed from a sponge rubber or the like so long as the walls are sealed to prevent the sponge from absorbing the liquid. This type of construction has the advantage that the chamber would not collapse completely and in addition, a single puncture would not completely destroy the usefulness of the article immediately. However, the volume of air entrapped is smaller and, therefore, I prefer to use the chamber having the form of an enclosed bubble.

It is apparent that my invention will provide a shock absorbent spring mechanism having varied uses and multifarious possibilities and which is not as heavy as prior devices and is less subject to total failure.

Having thus described my invention, I am aware that numerous and extensive departures may be made therefrom without departing from the spirit or scope of the invention.

I claim:

1. A device of the class described comprising cylinder means, a piston slidably disposed in said cylinder means, said cylinder means being closed at both ends and being filled with liquid on both sides of said piston, resilient walled, gas filled chambers freely disposed in said liquid in said cylinder means, a supply chamber in connection with said cylinder means having apertures leading from said cylinder means to said supply chamber, said supply chamber also being filled with liquid, and resilient walled, gas filled chambers freely disposed in said liquid in said supply chamber adapted to be compressed when the pressure on said liquid is increased.

2. A device of the class described comprising cylinder means, a piston slidably disposed in said cylinder means, said cylinder means being closed at both ends and being filled with liquid on both sides of said piston, resilient walled, gas filled chambers freely disposed in said liquid in said cylinder means, a supply chamber in connection with said cylinder means, having apertures leading from said cylinder means to said supply chamber, said supply chamber also being filled with liquid, resilient walled, gas filled chambers disposed in said liquid in said supply chamber adapted to be compressed when the pressure on said liquid is increased, and valve means slidably disposed in said cylinder means adapted to control the flow of liquid through said apertures depending on the position of said piston.

3. A device of the class described comprising cylinder means closed at both ends, a piston slidably disposed in said cylinder means having a piston rod extending through one of said closed ends, valve means slidably disposed in said cylinder means between said piston and said closed ends forming spring chambers between said valve means and said ends and pressure chambers between said valve means and said piston, resilient means disposed in said spring chambers, a supply chamber means fixed to said cylinder means, said cylinder means having orifices connecting it to said supply chamber means, said orifices adapted to be opened or closed by said valve means, said supply chamber means and pressure chambers being filled with liquid, and resilient walled, gas filled means disposed in said liquid in said supply chamber means adapted to be compressed when the pressure on said liquid is increased.

4. A device of the class described comprising a cylinder closed at both ends, a piston slidably disposed in said cylinder having a piston rod extending through one of said closed ends, valves slidably disposed in said cylinder on opposite sides of said piston, means between said valves and said closed ends forming spring chambers between each of said valves and said ends, resilient means disposed in said spring chambers, a supply chamber fixed to said cylinder, said cylinder having orifices connecting it to said supply chamber, said orifices adapted to be opened or closed by said valves, said supply chamber and pressure chamber being filled with liquid, and resilient walled, gas filled means disposed in said liquid in said supply chamber adapted to be compressed when the pressure on said liquid is increased.

References Cited in the file of this patent

UNITED STATES PATENTS

| Number | Name | Date |
|---|---|---|
| 790,476 | Borland | May 23, 1905 |
| 979,694 | Polleys | Dec. 27, 1910 |
| 1,350,414 | Langdon | Aug. 24, 1920 |
| 1,673,547 | Baquie | June 12, 1928 |
| 1,825,823 | Ryder | Oct. 6, 1931 |
| 2,106,461 | Leslie | Jan. 25, 1938 |
| 2,165,465 | Ehrhardt et al. | July 11, 1939 |
| 2,308,404 | Thornhill | Jan. 12, 1943 |

FOREIGN PATENTS

| 581,417 | Great Britain | Oct. 11, 1946 |